United States Patent
Ikuta et al.

(10) Patent No.: US 6,243,719 B1
(45) Date of Patent: *Jun. 5, 2001

(54) DATA CACHING APPARATUS, DATA CACHING METHOD AND MEDIUM RECORDED WITH DATA CACHING PROGRAM IN CLIENT/SERVER DISTRIBUTED SYSTEM

(75) Inventors: Masanao Ikuta; Tomoaki Kambe; Satoshi Takida, all of Shizuoka (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/042,796

(22) Filed: Mar. 17, 1998

(30) Foreign Application Priority Data

Oct. 20, 1997 (JP) .................................................... 9-287322

(51) Int. Cl.[7] .................................................... G06F 17/30
(52) U.S. Cl. ............................................ 707/204; 707/203
(58) Field of Search ................................. 707/204, 203, 707/201, 200, 6, 9, 8, 10, 1, 2; 709/213

(56) References Cited

U.S. PATENT DOCUMENTS

| | | | |
|---|---|---|---|
| 4,167,782 | | 9/1979 | Joyce et al. ........................... 711/141 |
| 5,452,447 | * | 9/1995 | Nelson et al. ......................... 707/205 |
| 5,452,448 | | 9/1995 | Sakuraba et al. ..................... 707/201 |
| 5,611,049 | * | 3/1997 | Pitts .......................................... 707/8 |
| 5,734,898 | * | 3/1998 | He ........................................ 707/203 |
| 5,835,942 | * | 11/1998 | Putzolu ................................. 711/113 |
| 5,864,837 | * | 1/1999 | Maimone ................................ 707/1 |
| 5,864,854 | * | 1/1999 | Boyle .................................... 707/10 |
| 5,873,100 | * | 2/1999 | Adams et al. ........................ 707/204 |
| 5,878,218 | * | 3/1999 | Maddalozzo, Jr. et al. .......... 709/213 |
| 5,896,506 | * | 4/1999 | Ali et al. .............................. 709/213 |

FOREIGN PATENT DOCUMENTS

| | | | |
|---|---|---|---|
| 0 604 013 A2 | 6/1994 | (EP) | ................................ G06F/12/08 |
| 0 689 140 A2 | 12/1995 | (EP) | .................................. G06F/9/46 |
| 10021134A | 1/1998 | (JP) | ................................ G06F/12/00 |

\* cited by examiner

*Primary Examiner*—Hosain T. Alam
*Assistant Examiner*—Sanjiv Shah
(74) *Attorney, Agent, or Firm*—Staas & Halsey LLP

(57) ABSTRACT

A data caching apparatus, data caching method and medium recorded with data caching program in client/server distributed systems, wherein, when there is a request from a client for reference to a database, duplicate of reference request data retained in a cache file is preferentially sent back to the client, and the duplicate data retained in the cache file is updated in the server background.

18 Claims, 6 Drawing Sheets

DATA CACHING APPARATUS, DATA CACHING METHOD AND MEDIUM RECORDED WITH DATA CACHING PROGRAM IN CLIENT/SERVER DISTRIBUTED SYSTEM

FIELD OF THE INVENTION

The present invention relates to a client/server distributed system, and in particular to a technique for improving the system response speed.

RELATED ART OF THE INVENTION

In typical client/server distributed systems, databases are provided on the server side and the application programs are provided on the client side. The server administrates the database stored on disk and responds to processing requests from clients. Access authorization for each client (for example, reference only, update capability, read and write capabilities, erase capability) is set on the server for each piece of data in the database. Then, when a database processing request is received from a client, the server checks the access authorization for the client, and if the processing request is allowed, carries out the requested processing on the database.

One application of client/server distributed systems is an electronic conference system, where an unspecified plurality of users exchange information. Electronic conference systems are usually described in terms of containers called forums. A forum contains actual information in the form of hierarchical messages. A user of an electronic conference system first sends a request from a client to the server requesting a listing of the messages contained in a certain forum. The server subsequently retrieves the messages contained in the specified forum from the database, creates a message list, and then returns this list to the client. The client receives and then displays this list of messages. When the user of the electronic conference system then selects a message from the displayed list, the database on the server is retrieved and the message displayed on the client.

However, because database access speed is generally slow, there is a time delay from when the user of the electronic conference system requests a listing of messages until the client actually displays the list of messages. Furthermore, after the list of messages has been displayed, there is further delay when the user then selects a message. That is, the response speed of the system depends on the access speed of the database.

Consequently, a technique has been proposed for improving the response speed of the system, wherein the results of database retrieval are cached periodically in a file on the server, and in those cases where the retrieval result for a database retrieval request is in the file, the cached retrieval result is returned to the client.

However, current application of this technique has the following type of problems.
(1) For databases which are updated regularly, there is a danger that the most recent information will not be returned to a client following a retrieval request. That is, because the retrieval results cached in the file are cached periodically, they do not necessarily represent the most up to date data.
(2) The retrieval results cached in the file are the results of periodic retrieving of the database, so even data which do not require re-retrieving (data which have not been added to, or updated) are retrieved, resulting in wasted retrieval processing.
(3) Because retrieval results cached in the file are returned to the client, it is not possible to check the client access authorization set for each data to be retrieved.

SUMMARY OF THE INVENTION

The present invention takes into consideration the above problems with an object of improving the data caching method, and providing a client/server distributed system with improved system response speed.

Furthermore, another object of the present invention is to distribute media recorded with the data caching program of the present invention, so that people who acquire the medium can easily establish a data caching apparatus.

As a first means to achieve the objects, there is provided a data caching apparatus in a client/server distributed system, comprising a database for storing a predetermined data, a server for administrating the database, a client which communicates with the server and refers to the database, a retention device for retaining a predetermined number of duplicates of the data, a reference request detection device for detecting that a request is made from the client for reference to the database, a caching device which preferentially sends the duplicate of reference request data retained in the retention device back to the client when the reference request detection device detects a request for reference to the database, a data update device which retrieves the database and updates the duplicate data retained in the retention device, and an execution device for executing the data update device in the server background when the reference request detection device detects a request for reference to the database.

With such a construction, when the client sends a request to the server for reference to the database, the duplicate of reference request data retained in the retention device is preferentially returned to the client. That is, in those cases where the reference request data is retained in the retention device, the duplicate data retained in the retention device is returned to the client. On the other hand, in those cases where the reference request data is not retained in the retention device, the database is retrieved, and the results of the retrieval then sent back to the client. Consequently, provided the reference request data is retained in the retention device, no retrieving of the database occurs, allowing a great improvement in the response speed of the system.

When the client sends a request to the server for reference to the database, the duplicate data retained in the retention device is updated in the server background. That is, the updating of the data retained in the retention device occurs appropriately and it is therefore possible to refer to the most recent data. Furthermore, because the updating of the data retained in the retention device occurs only in the background when the server has surplus processing capability, it does not lower the response speed of the system.

Furthermore, the construction may incorporate an update judgment device for judging whether or not there has been updating of the data stored in the database, between the previous reference request and the current reference request, wherein the execution device executes the data update device in the server background only when the reference request detection device detects a request for reference to the database and the update judgment device judges that there has been updating of the data.

With such a construction, updating of the duplicate data retained in the retention device occurs only when there is a database reference request from the client and when there has been updating of the data retained in the database, between the previous reference request and the current reference request. Consequently, the updating of the duplicate data stored in the retention device is kept to a minimum, and unnecessary retrieving of the database is prevented, so that the system load accompanied with database retrieval processing can be reduced.

Moreover the construction may be such that the database stores access authorization information for the client for each data stored in the database is stored in the database, and there is provided an access authorization judgment device which, when the reference request detection device detects a request for reference to the database, judges whether or not the client has access authorization for the data specified by the reference request, based on the access authorization information stored in the database.

With such a construction, when the client sends a request to the server for reference to the database, a judgment is made as to whether or not the client has access authorization for the reference request data. Consequently, even in those cases where duplicate data retained in the retention device is returned to the client, a check on the access authorization of the client is still conducted, and so the security of the system can be guaranteed.

Furthermore, the construction may be such that the retention device retains list data of the data stored in the database.

With such a construction, in those cases where there is a request from the client for list data of data stored in the database, a database retrieval, with its inherently slow access speed does not occur, but rather the list data retained in the retention device is returned to the client. Consequently, because a database retrieval, with its inherently slow access speed does not occur, the response speed of the system can be improved even further.

Moreover, the construction may be such that the retention device administrates the database reference results using an LRU (least recently used) method.

With such a construction, because the duplicate data retained in the retention device is administrated using the LRU method, the probability of any reference request data being retained in the retention device increases. That is, experience shows that there is a high probability that requested data will be data that has been recently generated or updated, so by using the LRU method it is possible to improve the hit ratio. By improving the hit ratio, the response speed of the system can be improved even further.

As a second means for achieving the aforementioned objects, there is provided a data caching method in a client/server distributed system, comprising a data storage process for storing a predetermined data, a server process for administrating the data storage process, a client process which communicates with the server process and refers to the data storage process, a retention process for retaining a predetermined number of duplicates of the data, a reference request detection process for detecting that a request is made from the client process for reference to the data storage process, a caching process which preferentially sends the duplicate of reference request data retained in the retention process back to the client process when the reference request detection process detects a request for reference to the data storage process, a data update process which retrieves the data storage process and updates the duplicate data retained in the retention process, and an execution process for executing the data update process to run in the server process background when the reference request detection process detects a request for reference to the data storage process.

With such a construction, when the client process sends a request to the server process for reference to the data storage process, the duplicate of reference request data retained in the retention process is preferentially returned to the client process. That is, in those cases where the reference request data is retained in the retention process, the duplicate data retained in the retention process is returned to the client process. On the other hand, in those cases where the reference request data is not retained in the retention process, the data storage process is retrieved, and the results of the retrieval then sent back to the client process. Consequently, provided the reference request data is retained in the retention process, no retrieving of the data storage process occurs, allowing a great improvement in the response speed of the system.

When the client process sends a request to the server process for reference to the data storage process, the duplicate data retained in the retention process is updated in the server process background. That is, the updating of the data retained in the retention process occurs appropriately and it is therefore possible to refer to the most recent data. Furthermore, because the updating of the data retained in the retention process occurs only in the background when the server process has surplus processing capability, it does not lower the response speed of the system.

As a third means for achieving the aforementioned objects, there is provided a medium recorded with a data caching program in a client/server distributed system, the program realizing a data storage function for storing a predetermined amount of data, a server function for administrating the data storage function, a client function which communicates with the server function and refers to the data storage function, a retention function for retaining a predetermined number of duplicates of the data, a reference request detection function for detecting that a request is made from the client function for reference to the data storage function, a caching function which preferentially sends the duplicate of reference request data retained by the retention function back to the client function when the reference request detection function detects a request for reference to the data storage function, a data update function which retrieves the data storage function and updates the duplicate data retained in the retention function, and an execution function for executing the data update function in the server function background when the reference request detection function detects a request for reference to the data storage function.

In this case, the "medium" may be any medium which allows reliable storage of various information and which also allows the reliable retrieval of information as it is needed; specifically media such as paper cards (punch cards), paper tapes, magnetic tapes, magnetic disks, magnetic drums, CD-ROMs, and IC cards.

With such a construction, because the programs necessary for achieving the aforementioned data storage function, the server function, the client function, the retention function, the reference request detection function, the caching function, the data update function, and the execution function are all stored on the medium, the data caching program of the present invention is easily distributed. Consequently, people who obtain a medium recorded with the program can easily establish the data caching apparatus according to the present invention.

Moreover as mentioned above, each time there is a reference request, the duplicate data retained in the retention function is updated in the background of the server function. Consequently, it is possible to refer to the most recent data without lowering the response speed of the system.

Other objects and aspects of the present invention will become apparent from the following description of the embodiments given in conjunction with the appended drawings.

PREFERRED EMBODIMENT

As follows is a detailed description of the present invention with reference to the appended drawings.

Figure 1:
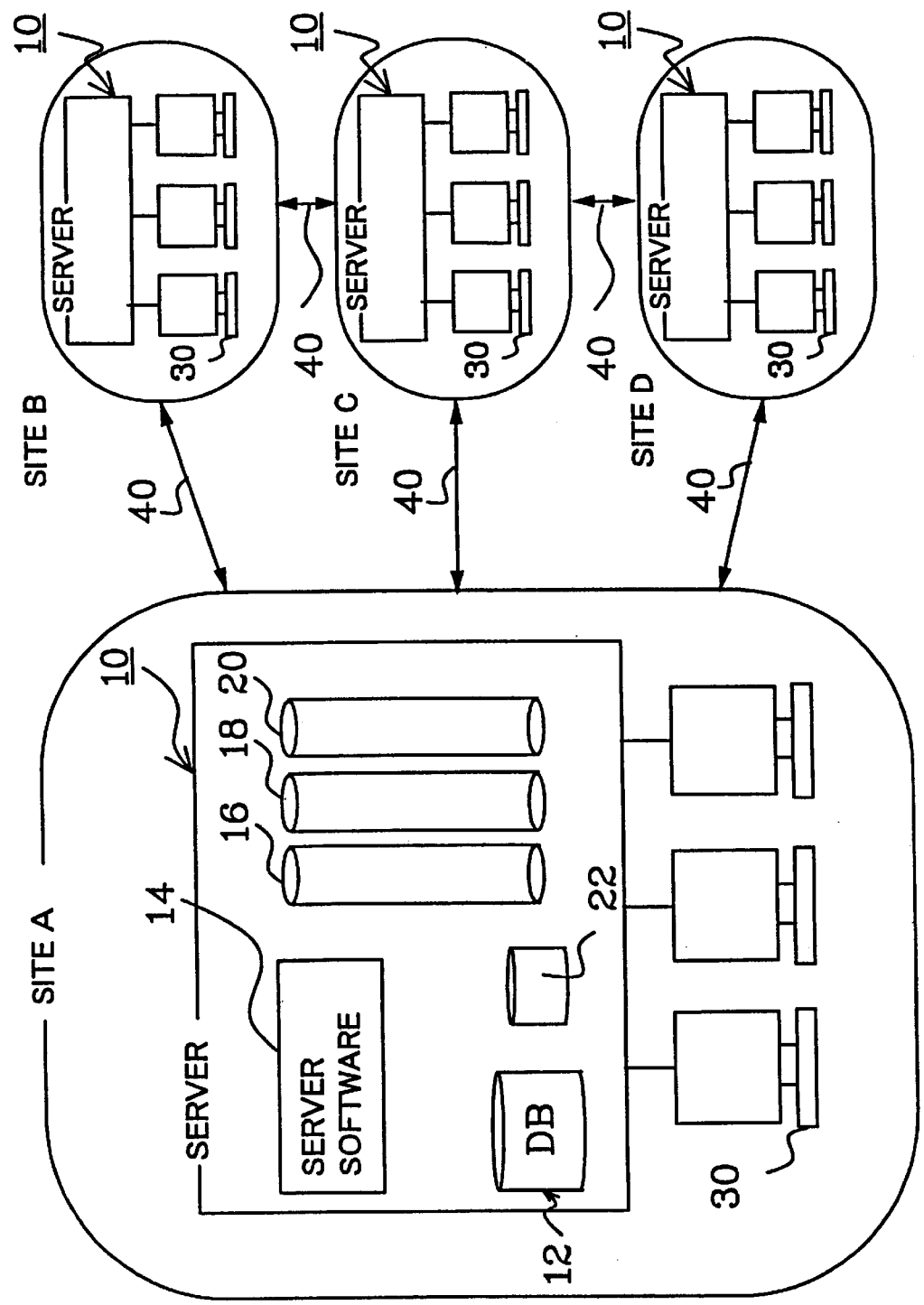
FIG. 1 is a system diagram showing an embodiment of the present invention.

FIG. 1 shows an embodiment of an electronic conference system of the present invention establishing a client/server distributed system between four geographically separate areas (hereafter referred to as "sites") labelled A, B, C and D. The servers and clients are electronic computers equipped with at least a central processing unit (CPU) and memory, and which execute programs stored in memory.

Each site comprises one server 10 (server process, server function) and at least one client 30 (client process, client function). Each site is mutually interconnected by communication lines 40. Furthermore, factors such as the communication speed through the communication lines 40 at each site are taken into consideration and information exchanged using a store and forward type communication system. That is, information originating at a client 30 at site A is not sent to sites B, C and D immediately, as it is being produced, but is stored at site A for a while and then batch transmitted at predetermined time intervals.

A server 10 comprises a database 12 (data storage process, data storage function), server software 14, a command queue 16, a send queue 18, a receive queue 20, and a cache file 22 (retention device, retention process, retention function). The server software 14 carries out retrieval and updates of the database 12. The command queue 16 stores the operational content of information generated at the site. The send queue 18 stores information to be sent to other sites. The receive queue 20 stores information received from other sites. The command queue 16, the send queue 18 and the receive queue 20 each comprises a file made up of a FIFO type (first in, first out) queue.

The server software 14 realizes, by means of a program, a reference request detection device, a caching device, a data update device, an activation device, an access authorization judgment device, an update judgment device, a reference request detection process, a caching process, a data update process, an activation process, a reference request detection function, a caching function, a data update function, and an activation function.

Figures 2, 3:
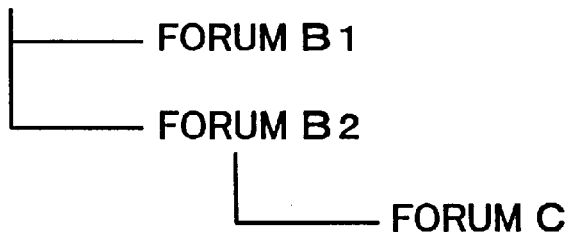
FIG. 2 is an explanatory diagram showing a hierarchical structure of a forum of the embodiment.
FIG. 3 is an explanatory diagram showing a hierarchical structure of a message of the embodiment.

Forums, which are the units (containers) for conducting information exchange, are created in the database 12. Forums, as shown in FIG. 2, can take a hierarchical structure, with the uppermost forum A referred to as the "main forum", and the other forums $B_1$, $B_2$, C called "sub forums". It is possible to have a plurality of sub forums at the same hierarchical level, and in FIG. 2 forums $B_1$ and $B_2$ exist at the same hierarchical level.

A series of hierarchical messages are contained in each forum, as shown in FIG. 3. The uppermost message A is called the "topic". This provides a topic for discussion such as "re . . . ". The other messages B, $C_1$, $C_2$, D are called "reply" and contain responses to certain messages. It is possible for there to be a plurality of responses to a single message, and in FIG. 3 messages $C_1$ and $C_2$ are responses to message B.

An original copy of the forum is stored at the site where the forum was created, and a replica of the forum is stored at the other sites. The users of the forum in an electronic conference system then carry out processing such as message creation on the forum stored at the site to which they are attached (be it the original or a replica). Any processing which is carried out is then transmitted using store-and-forward type communication methods, via the communication lines 40, to the other sites, and reflected in the forum at the other sites. That is, a time delay develops between the content of the forum at each of the sites.

The cache file 22 of the server 10 stores at least a list of the messages of each of the forums stored in the database 12, as well as a copy of a predetermined number (for example 100) of messages. The cache file 22 is updated in the background when the server 10 has some surplus processing capability.

Next is a description of the operation of an electronic conference system configured as described above.

First, is a summary of the information exchange which occurs between sites, with reference to FIG. 1. In the description below, it will be assumed for the sake of simplicity, that the information is being exchanged between sites A and B.

When a user of the electronic conference system carries out the creation, deletion, updating or transferring of a forum or message (hereafter jointly referred to as an "object") at a client 30 of site A, the server software 14 carries out storage processing appropriate for the operation of the object on the database 12. At the same time, the server software 14 also registers the content of the operation at site A in the command queue 16.

The operational content stored in the command queue 16 is taken out from the command queue 16 into the server 10 background when surplus processing capability is available. The actual body of the object being processed (the body of text in the case of a message) is then retrieved from the database 12, if necessary, and the operational content and the body of the object (hereafter jointly referred to as the "communication information") is then registered in the send queue 18.

The communication information stored in the send queue 18 is then taken out from the send queue 18 at predetermined intervals and sent to site B via the communication line 40. The predetermined intervals here can be set arbitrarily by the administrator of the electronic conference system, and for example could be set so that the communication information is sent late at night or early in the morning when the communication line 40 is under utilized.

The communication information sent from site A to site B is not processed immediately at site B, but is rather stored temporarily in the receive queue 20. The communication information stored in the receive queue 20 is then taken out from the receive queue 20 and the appropriate storage processing carried out on the database 12 in the server 10 background. That is, the processing conducted on the object at site A, is reflected at site B following a time delay.

Figure 4:
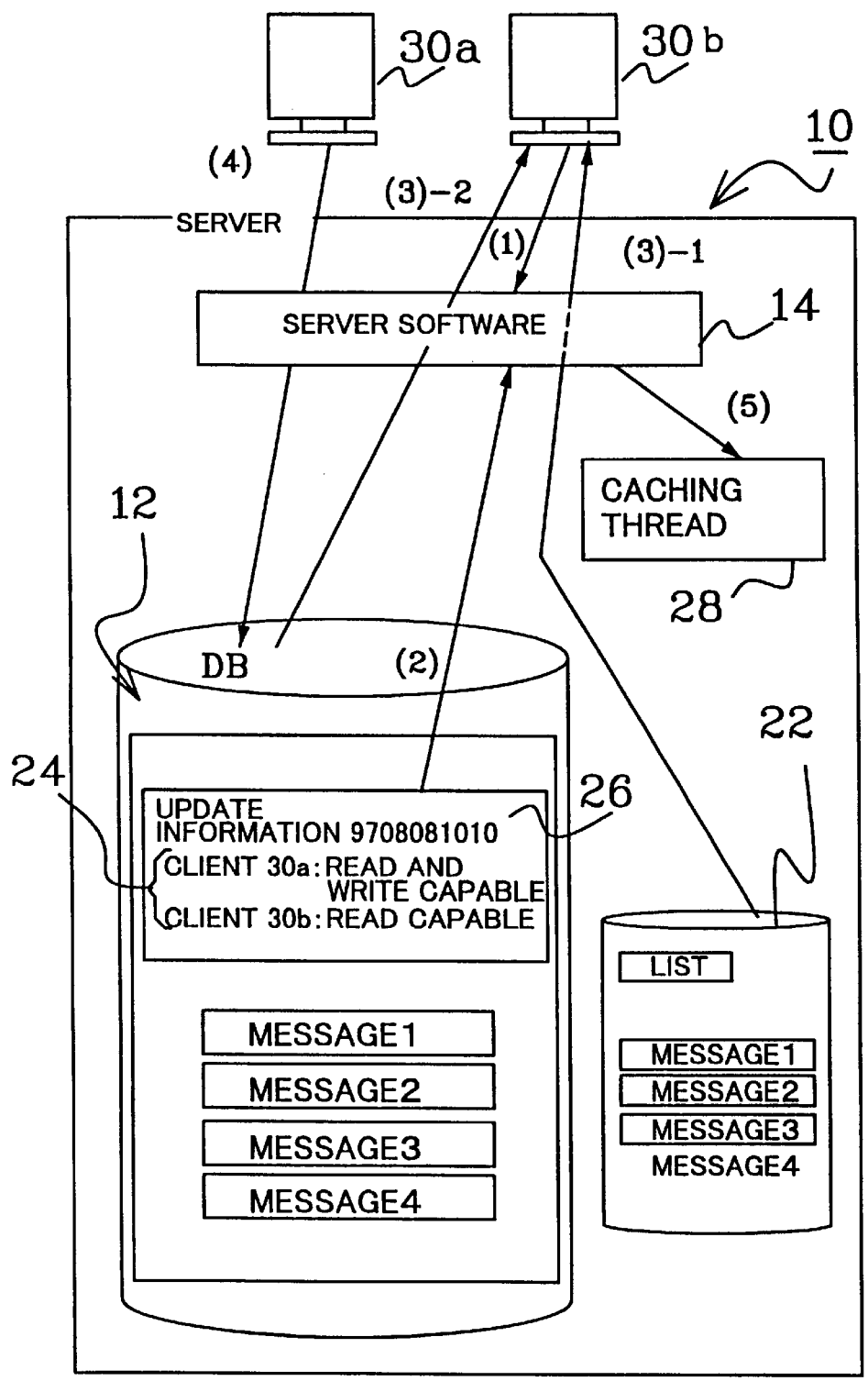
FIG. 4 is a processing flow diagram showing the flow of the data caching processing.

Next is a summary of the data caching processing of the electronic conference system, with reference to the processing flow diagram in FIG. 4.

When there is a reference request for message 1 of forum A, from a client 30b to the server 10 (process (1)), the access authorization for the client 30b to forum A is checked (process (2)). When a forum is created, access authorization to the forum is set for each client by the creator of the forum, and this access authorization is stored in the database 12. Specifically, the client 30b attempting to gain access to the forum A and the access authorization 24 stored in the database 12 are compared to judge whether or not the client 30b has the access authorization to the forum A.

In those cases where the client 30b does have access authorization, a check is made as to whether or not message 1 of forum A is stored in the cache file 22. If the message 1 is stored in the cache file 22, then the message 1 is sent from the cache file 22 to the client 30b (process (3)-1) without any searching of the database 12. On the other hand, if the message 1 is not stored in the cache file 22, the message 1 is searched out from the database 12 and the search results sent back to the client 30b (process (3)-2).

Furthermore, at the same time as the access authorization for the client 30b is checked, a check is also made as to whether or not there has been updating of the database 12, between the previous reference request and the current reference request. Specifically, by comparing the time of update for forum A of the update information 26 stored in the database 12 with the time of update for each object, it is possible to judge whether or not the database 12 has been updated. The update information 26 is updated whenever an object is created from any of the clients (for example client 30a) (process (4)). In those cases where the database 12 has been updated, a caching thread 28 is formed to activate the update process for updating the cache file 22 in the server 10 background (process (5)).

Figure 5:
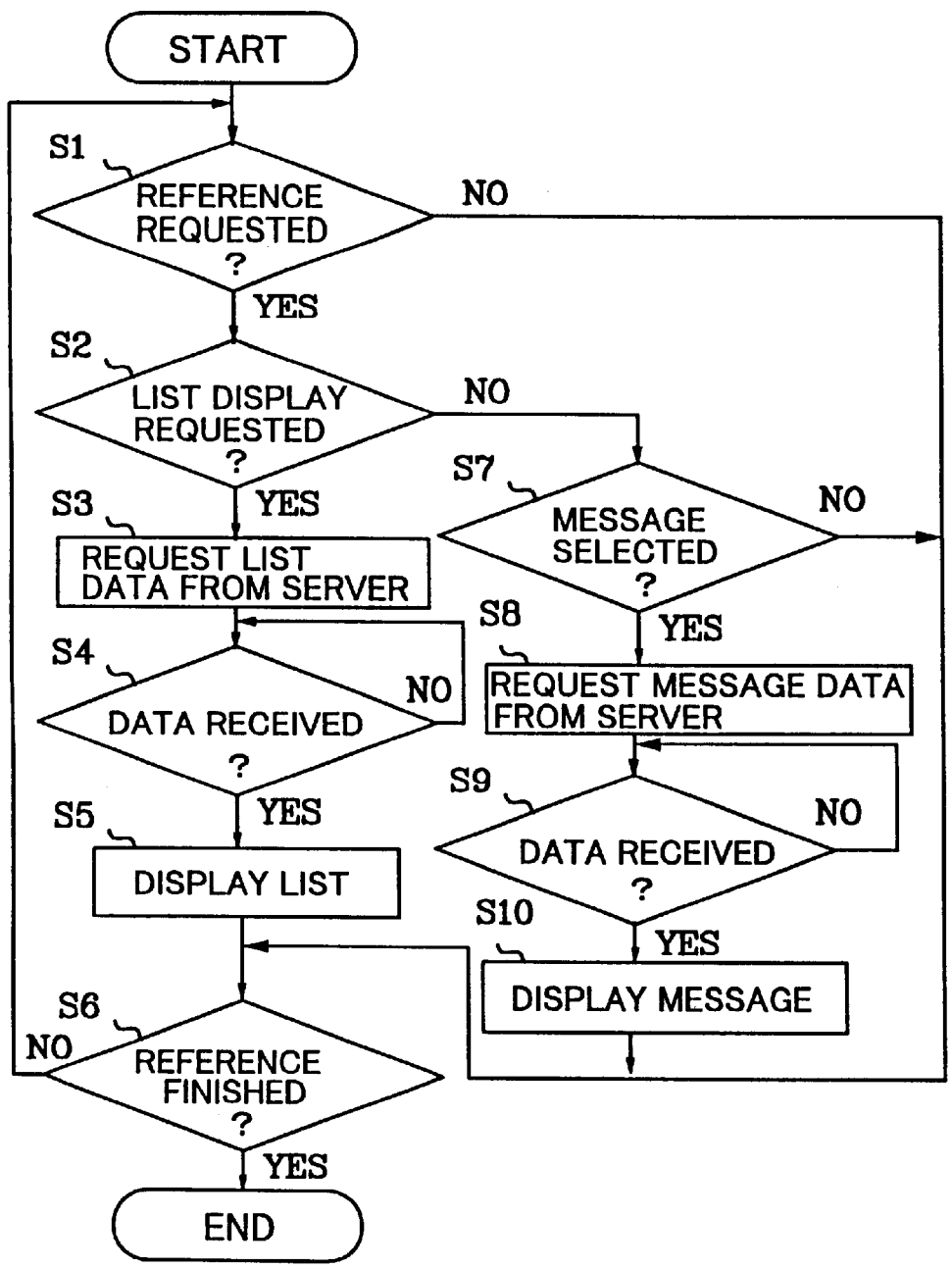
FIG. 5 is a flow chart showing the content of the process at a client.
Figure 6:
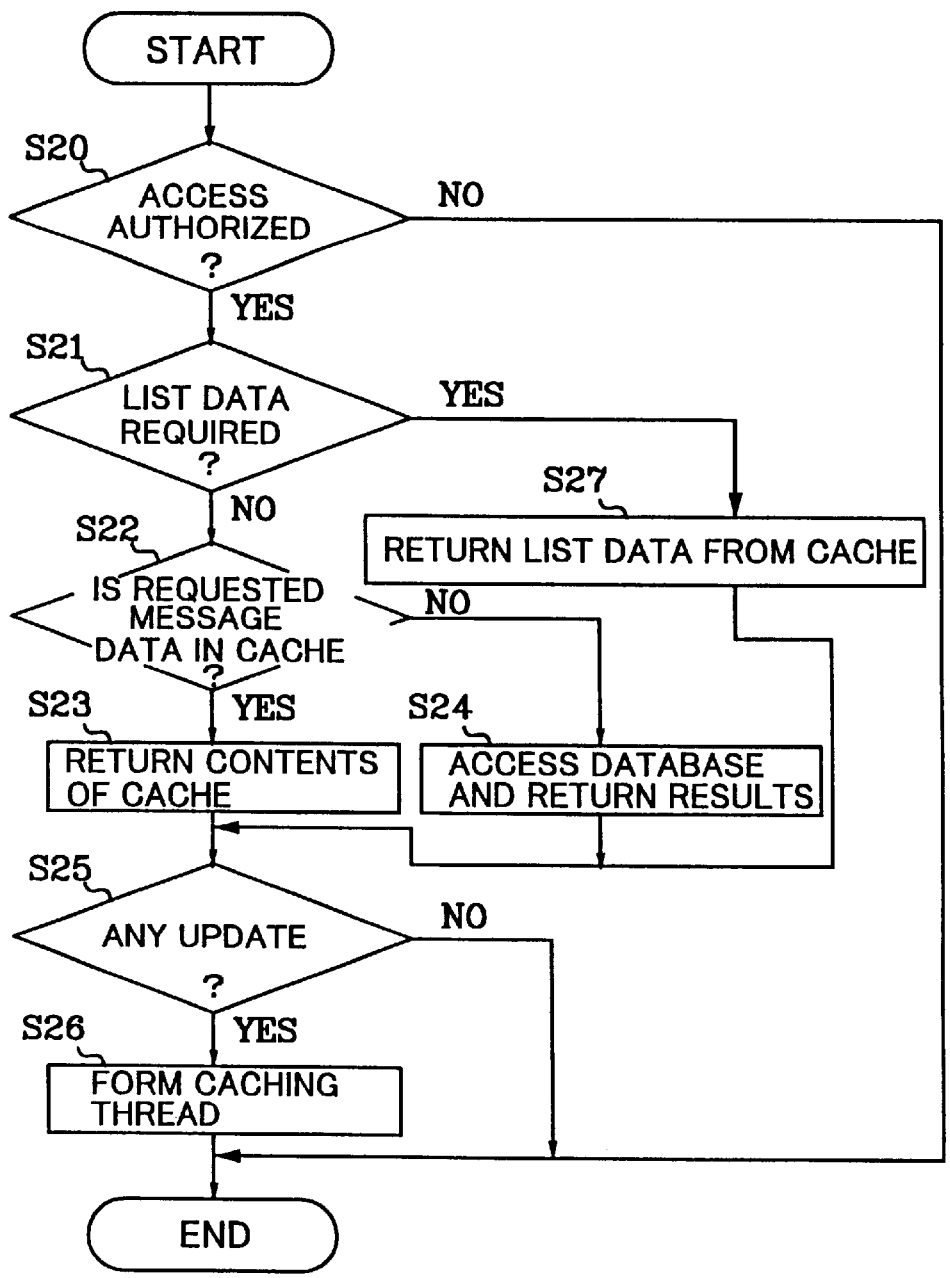
FIG. 6 is a flow chart showing the content of the process at a server.
Figure 7:
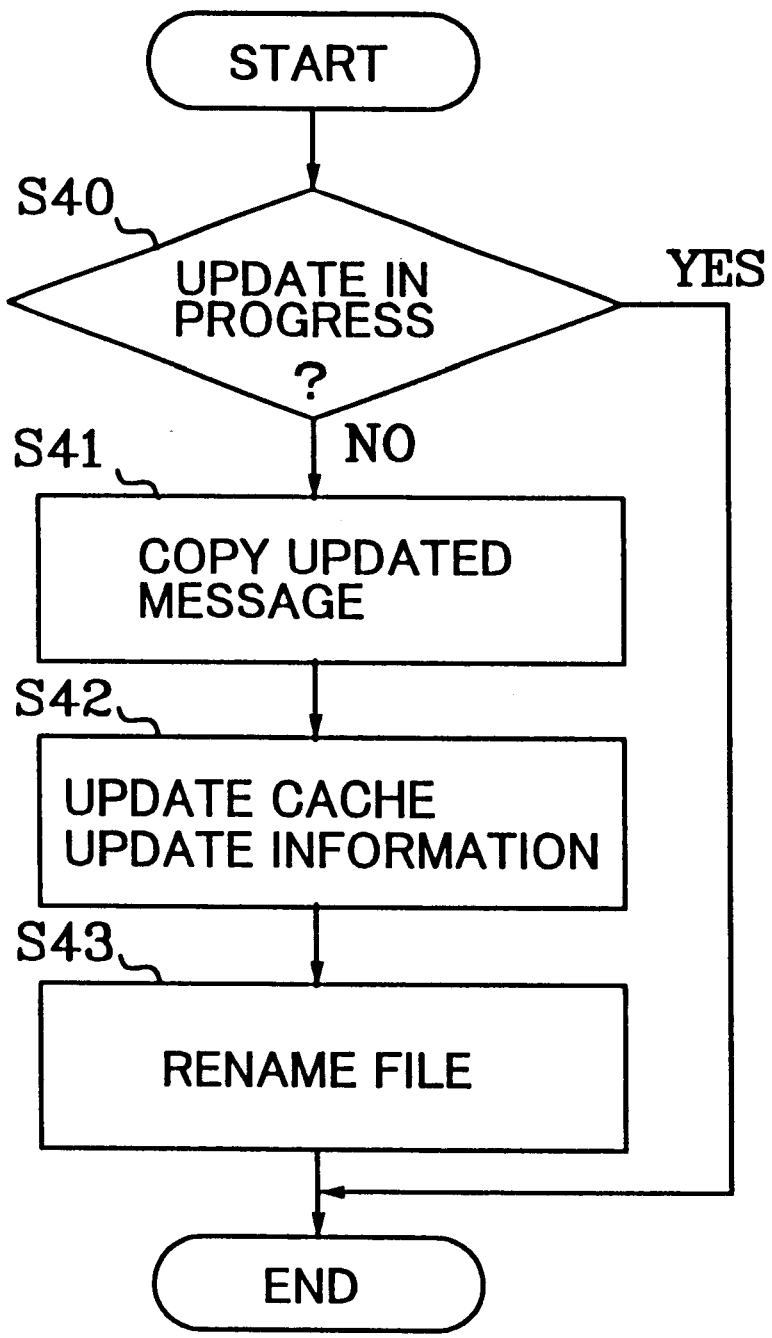
FIG. 7 is flow chart showing the content of the process in the background.

FIGS. 5 through 7 show flowcharts detailing the above database search processes in the electronic conference system.

FIG. 5 shows the process executed at a client 30 when reference is made to a message.

In step 1 (abbreviated to S1 in the figures with other steps similarly abbreviated) a judgment is made as to whether or not the user of the client 30 has referred to a message. If a reference has been made control proceeds to step 2 (Yes), while if a reference has not been made control proceeds to step 6 (No). Thus, the processing at step 1 corresponds to the reference request detection device, the reference request detection process, and the reference request detection function.

In step 2 a judgment is made as to whether or not the reference request is for a message list. If the reference request is for a list then control proceeds to step 3 (Yes), and the processing of the subsequent steps 3~5 displays a list of the messages in the forum. On the other hand, if the reference request is not for a list, that is, if the selection is a message chosen from a displayed message list, then control proceeds to step 7 (No), and the processing of the subsequent steps 7~10 displays the content of the chosen message.

In detail this means that at step 3 a request for message list data is sent to the server 10. In response to this request the server 10 carries out the processing detailed below in FIG. 6, and sends back the message list data.

In step 4 a judgment is made as to whether or not the message list data from the server 10 has been received, with control pausing at this point until the data is received. In those cases where the message list data is unobtainable from the server 10 an error message is sent.

In step 5 the received message list data, or alternatively an error message is displayed.

In step 6 a judgment is made as to whether or not the message reference has been completed at the client 30. If the reference has been completed then the routine finishes (Yes), while if the reference is still incomplete control returns to step 1 (No). The judgment as to whether or not the reference has been completed, could be made for example, by detecting whether or not the client 30 has logged off.

In step 7 a judgment is made as to whether or not a message has been selected from the message list. If a message has been selected then control proceeds to step 8 (Yes), while if no message has been selected control proceeds to step 6 (No).

In step 8 a message data request is sent to the server 10. In response to this request, the server 10 carries out the processing detailed below in FIG. 6, and then returns the message data.

In step 9 a judgment is made as to whether or not any message data from the server 10 has been received, with control pausing at this point until the data is received. In those cases where the message data is unobtainable from the server 10, an error message is sent back.

In step 10 the received message data, or alternatively an error message is displayed.

FIG. 6 shows the processing carried out by the server 10 when it receives a data request from a client 30.

In step 20 the access authorization for the client 30 which initiated the data request is checked. That is, the client 30 attempting to gain access to a forum and the access authorization information 24 stored in the database 12 are compared to judge whether or not the client 30 has the access authorization to each of the forums. If the client has access authorization control proceeds to step 21 (Yes), while if the client does not have access authorization then this routine finishes (No). Thus, the processing at step 20 corresponds to the access authorization judgment device.

In step 21 a judgment is made as to whether or not the requested data is message list data. If the request is for list data control proceeds to step 27 (Yes), while if the request is not for list data, meaning it will be for message data, control proceeds to step 22 (No).

In step 22 a judgment is made as to whether or not the requested message data is stored in the cache file 22. If the data is stored in the cache file 22 control proceeds to step 23 (Yes), while if the data is not stored in the cache file 22 control proceeds to step 24 (No).

In step 23, because the requested message data is present in the cache file 22, the message data is sent back from the cache file 22 and no searching of the database 12 occurs.

In step 24, because the requested message data is not present in the cache file 22, the database 12 is searched, and the message data produced as a result of the search is sent back.

In step 25 a judgment is made as to whether or not there has been message updating, between the previous reference request and the current reference request. That is, when there is an action by a client 30 in the forum such as the writing of a message, an update, or a deletion, it is possible, by comparing the time of update of the update information 26 stored in the database 12 with the creation time of the message, to judge whether or not there has been message updating. In those cases where message updating has occurred control proceeds to step 26 (Yes), while if no message updating has occurred this routine finishes (No). Thus, the processing in step 25 corresponds to the update judgment device.

In step 26, because there has been message updating between the previous reference request and the current reference request, the cache file 22 needs to be updated in the background of the server 10, and so a caching thread 28 is formed which activates the processing for updating the cache file 22. Thus, the processing in step 26 corresponds to the activation device, the activation process, and the activation function.

In step 27 processing occurs for those cases where the data request from the client 30 is for message list data. That is, the cache file 22 is searched, and the message list data returned. The message list data is created in the cache file 22 automatically when the electronic conference system is first activated. Moreover, the list data is also automatically updated (details below) every time a message is updated.

Thus the processing in steps 21~24 and step 27 correspond to the caching device, the caching process, and the caching function.

FIG. 7 shows the processing for updating the cache file 22, which is carried out in the server 10 background. The cache file 22 update processing is executed when the caching thread 28 is formed at step 26 of FIG. 6, and when the server 10 is in background. Thus all of the processing of FIG. 7 corresponds to the data update device, the data update process, and the data update function.

In step 40 a judgment is made as to whether or not any processing for updating a message is currently being carried out via another thread. If update processing is in progress then this routine finishes (Yes), while if no update processing is in progress control proceeds to step 41 (No). The reason for immediately finishing this routine if processing for updating a message is in progress, is that when for example, processing for the addition or deletion of messages is in progress, the content of the database 12 is not definitely confirmed and so even if the cache file 22 is updated based on the content of the database 12, the content will change again almost immediately.

In step 41 an updated message is searched out from the database 12, and a message copy file created based on the search results.

In step 42 the update information 26 stored in the database 12 is updated. The update information 26 is employed at step 25 of the flowchart shown in FIG. 6 for determining whether or not any update has been made to the cache file 22.

In step 43 the copy file created in step 41 is renamed and converted to a message in the cache file 22. The reason for generating a message in the cache file 22 by renaming the file in this way, is to improve processing speed.

In the background processing for updating the cache file 22, the access authorization for the client 30 is not checked. This is because the access authorization for the client 30 is checked when the client 30 makes a request for reference to the database 12, and so a double check is unnecessary. As a result, the speed of the update processing can be improved.

With a data caching apparatus comprising each of the processing processes explained above, when there is a request from a client 30 for message list data in a forum, the message list data is not created by searching the database 12, but rather is sent back from the message list data created in the cache file 22. Consequently a database 12 search, with its inherent slow access speed, does not occur, and the request from the client 30 can be responded to rapidly, enabling a great improvement in the response speed of the electronic conference system.

Furthermore, when there is a message data request from the client 30, first a judgment is made as to whether or not the message data exists in the cache file 22, and if the message data is in the cache file 22, the message data is then returned to the client from the cache file 22. On the other hand, if the message data is not present in the cache file 22, then the database 12 is searched and the searched message data returned. Because the requested message data is often recently updated messages, then for example by controlling the message data stored in the cache file 22 using the LRU (least recently used) method it is possible to improve the probability of requested message data being present in the cache file 22. Consequently, the number of database accesses, which have inherently slow access speeds, are reduced and the response speed of the electronic conference system can be improved.

Moreover, because the updating of the cache file 22 occurs in the background of the server 10, even if the database 12 access speed is slow, any influence on the response speed of the electronic conference system is prevented.

The data caching apparatus of the present invention does not require alteration to the nucleus of the client/server distributed system, but can be configured on to existing systems as an add in, thus preventing an increase in work hours associated with a system change.

By storing a program with these types of functions onto media such as punch cards, paper tapes, magnetic tapes, magnetic disks, magnetic drums, CD-ROMs, or IC cards, the data caching program of the present invention can be easily distributed in the marketplace, and a person obtaining the medium could easily establish a data caching apparatus using a typical electronic computer.

What is claimed is:

1. A data caching apparatus in a client/server distributed system, said apparatus comprising a database for storing a predetermined data, a server for administrating said database, a client which communicates with said server and refers to said database, retention means provided in said server for retaining a predetermined number of duplicates of said data, reference request detection means for detecting that a request is made from said client for reference to said database, caching means which preferentially sends a duplicate of reference request data retained in said retention means back to said client when said reference request data is retained in said caching means and sends actual reference request data back to said client when said reference request data is not retained in said caching means, data update means which retrieves said database and updates said duplicate data retained in said retention means, and execution means for executing said data update means in said server background when said reference request detection means detects a request for reference to said database.

2. A data caching apparatus in a client/server distributed system, according to claim 1, incorporating update judgment means for judging whether or not there has been updating of the data stored in said database, between the previous reference request and the current reference request, wherein said execution means executes said data update means in the server background only when said reference request detection means detects a request for reference to said database and said update judgment means judges that there has been updating of said data.

3. A data caching apparatus in a client/server distributed system, according to claim 1, wherein said database stores access authorization information for said client for each piece of data stored in said database, and there is provided access authorization judgment means which, when said reference request detection means detects a request for reference to said database, judges whether or not the client has access authorization for the data specified by said reference request, based on the access authorization information stored in said database.

4. A data caching apparatus in a client/server distributed system, according to claim 1, wherein said retention means retains list data of said data stored in said database.

5. A data caching apparatus in a client/server distributed system, according to claim 1, wherein said retention means administrates said database reference results using an LRU (Least Recently Used) method.

6. A data caching method in a client/server distributed system, said method comprising: a data storage process for storing a predetermined data, a server process for administrating said data storage process, a client process which communicates with said server process and refers to said data storage process, a retention process provided in said server process for retaining a predetermined number of duplicates of said data, a reference request detection process for detecting that a request is made from said client process for reference to said data storage process, a caching process which preferentially sends a duplicate of reference request data retained in said retention process back to said client process when said reference request data is retained in said caching process and sends actual reference request data back to said client when said reference request data is not retained in said caching process, a data update process which retrieves said data storage process and updates said duplicate data retained in said retention process, and an execution process for executing said data update process to run in said server process background when said reference request detection process detects a request for reference to said data storage process.

7. A medium recorded with a data caching program in a client/server distributed system, said program realizing a data storage function for storing a predetermined data, a server function for administrating said data storage function, a client function which communicates with said server function and refers to said data storage function, a retention function providing in said server function for retaining a predetermined number of duplicates of said data, a reference request detection function for detecting that a request is made from said client function for reference to said data storage function, a caching function which preferentially sends a duplicate of reference request data retained in said retention function back to said client function when said reference request data is retained in said caching function and sends actual reference request data back to said client when said reference request data is not retained in said caching function, a data update function which retrieves said data storage function and updates said duplicate data retained in said retention function, and an execution function for executing said data update function to run in said server function background when said reference request detection function detects a request for reference to said data storage function.

8. A server-based method for administering data in a client/server distributed system, comprising:

retaining a predetermined number of duplicates of server-based data in a data cache within the server;

detecting an access request from a client for server-based data;

updating the duplicate data retained in the data cache upon detecting an access request for the data and determining that the data residing in the server does not match the corresponding duplicate data in the data cache, wherein the updating executes in the server background; and preferentially sending a duplicate of the requested data retained in the data cache back to the client following detecting an access request for the data from a client when the requested data is retained in said data cache and sending actual requested data back to the client when said requested data is not retained in said data cache.

9. A computer readable medium encoded with software to retain a predetermined number of duplicates of server-based data in a data cache within the server;

detect an access request from a client for server-based data; update the duplicate data retained in the data cache upon detecting an access request for the data and determining that the data residing in the server does not match the corresponding duplicate data in the data cache, wherein the updating executes in the server background; and preferentially send a duplicate of the requested data retained in the data cache back to the client following detecting an access request for the data from a client when the requested data is retained in said data cache and send actual requested data back to the client when said requested data is not retained in said data cache.

10. A data caching apparatus in a client/server distributed system, said apparatus comprising:

a database storing a predetermined data;

a server administrating said database;

a client which communicates with said server and refers to said database;

a retention device provided in said server retaining a predetermined number of duplicates of said data;

a reference request detection device detecting that a request is made from said client for reference to said database;

a caching device which preferentially sends a duplicate of reference request data retained in said retention device back to said client when said reference request data is retained in said caching device and sends actual reference request data back to said client when said reference request data is not retained in said caching device;

a data update device which retrieves said database and updates said duplicate data retained in said retention device; and a execution device executing said data update device in said server background when said reference request detection device detects a request for reference to said database.

11. A data caching apparatus in a client/server distributed system according to claim 10, further comprising;

an update judgment device judging whether or not there has been updating of the data stored in said database, between the previous reference request and the current reference request, wherein said execution device executes said data update device in the server background only when said reference request detection device detects a request for reference to said database and said update judgment device judges that there has been updating of said data.

12. A data caching apparatus in a client/server distributed system according to claim 10,
wherein said database stores access authorization information for said client for each piece of data stored in said database, and there is provided an access authorization judgment device which, when said reference request detection device detects a request for reference to said database, judges whether or not the client has access authorization for the data specified by said reference request, based on the access authorization information stored in said database.

13. A data caching apparatus in a client/server distributed system according to claim 10, wherein said retention device retains list data of said data stored in said database.

14. A data caching apparatus in a client/server distributed system according to claim 10, wherein said retention device administrates said database reference results using an LRU (Least Recently Used) method.

15. A data caching method in a client/server distributed system, said method comprising:
a data storage process storing a predetermined data;
a server process administrating said data storage process;
a client process which communicates with said server process and refers to said data storage process;
a retention process provided in said server process retaining a predetermined number of duplicates of said data;
a reference request detection process detecting that a request is made from said client process for reference to said data storage process;
a caching process which preferentially sends a duplicate of reference request data retained in said retention process back to said client process when said reference request data is retained in said caching process and sends actual reference request data back to said client when said reference request data is not retained in said caching process;
a data update process which retrieves said data storage process and updates said duplicate data retained in said retention process; and
an execution process executing said data update process to run in said server process background when said reference request detection process detects a request for reference to said data storage process.

16. A computer readable medium recorded with a data caching program in a client/server distributed system, said program comprising:
a data storage function storing a predetermined data;
a server function administrating said data storage function;
a client function which communicates with said server function and refers to said data storage function;
a retention function providing in said server function retaining a predetermined number of duplicates of said data;
a reference request detection function detecting that a request is made from said client function for reference to said data storage function;
a caching function which preferentially sends a duplicate of reference request data retained in said retention function back to said client function when said reference request data is retained in said caching function and sends actual reference request data back to said client when said reference request data is not retained in said caching function;
a data update function which retrieves said data storage function and updates said duplicate data retained in said retention function; and
an execution function executing said data update function to run in said server function background when said reference request detection function detects a request for reference to said data storage function.

17. An apparatus having a server comprising:
a retention device provided in said server retaining a predetermined number of duplicates of data; and
a caching device which preferentially sends a duplicate of request data retained in said retention device to a client when said requested data is retained in said caching device and sends actual request data back to said client when said request data is not retained in said caching device.

18. A method having a server comprising:
a retention process provided in said server retaining a predetermined number of duplicates of data; and
a caching process which preferentially sends a duplicate of request data retained in said retention process to a client when said requested data is retained in said caching process and sends actual request data back to said client when said request data is not retained in said caching process.

* * * * *